US012304051B2

(12) United States Patent
Zheng et al.

(10) Patent No.: US 12,304,051 B2
(45) Date of Patent: May 20, 2025

(54) POWER TOOL

(71) Applicant: Nanjing Chervon Industry Co., Ltd., Nanjing (CN)

(72) Inventors: Hanqing Zheng, Nanjing (CN); Xiangqing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/299,898

(22) Filed: Apr. 13, 2023

(65) Prior Publication Data

US 2023/0264338 A1 Aug. 24, 2023

Related U.S. Application Data

(63) Continuation of application No. PCT/CN2023/074214, filed on Feb. 2, 2023.

(30) Foreign Application Priority Data

Feb. 22, 2022 (CN) ......................... 202210160116.6

(51) Int. Cl.
*B25F 5/02* (2006.01)

(52) U.S. Cl.
CPC ...................................... *B25F 5/02* (2013.01)

(58) Field of Classification Search
CPC ............................... B25B 23/0028; B25F 5/02
See application file for complete search history.

(56) References Cited

U.S. PATENT DOCUMENTS 4,748,872 A * 6/1988 Brown .................. B25B 21/001 81/57.26
5,251,706 A * 10/1993 Evans .................. B25B 21/004 173/217
5,533,581 A * 7/1996 Barth ..................... B23Q 5/045 173/217
5,784,934 A * 7/1998 Izumisawa ............ B25B 21/004 81/177.8
5,943,925 A * 8/1999 Huang ................... B25G 1/007 81/177.1

(Continued)

FOREIGN PATENT DOCUMENTS

CN 103963016 A 5/2016
CN 111791190 A 10/2020

(Continued)

OTHER PUBLICATIONS

Extended European Search Report from European application No. 23182556.3, dated Dec. 22, 2023, 6 pp.

(Continued)

*Primary Examiner* — Dariush Seif
(74) *Attorney, Agent, or Firm* — Greenberg Traurig, LLP

(57) ABSTRACT

A power tool includes a main housing in which a drive mechanism is disposed and a working head connected to an end of the main housing and rotating relative to the main housing about a first axis. The working head includes an output shaft and the output shaft is driven by the drive mechanism to rotate about a second axis. The main housing is provided with a window portion and the window portion is configured to display an internal structure of the power tool.

26 Claims, 7 Drawing Sheets

(56) References Cited

U.S. PATENT DOCUMENTS 6,050,989 A * 4/2000 Fox .................. A61B 17/32002 606/1
6,311,583 B1 * 11/2001 Izumisawa ............. B25G 1/066 81/177.8
6,796,385 B1 9/2004 Cobzaru
6,928,902 B1 * 8/2005 Eyssallenne .............. B25F 5/02 81/57.44
6,935,212 B2 * 8/2005 Wadsworth ............. B25B 13/46 81/62
9,266,230 B2 * 2/2016 Maddilate ................. B25F 5/02
11,098,765 B2 8/2021 Yu
11,235,454 B2 2/2022 Sabin
2003/0095842 A1 * 5/2003 Bone ......................... B25F 5/02 408/234
2006/0011367 A1 * 1/2006 Teng ......................... B25F 5/00 173/217
2006/0262519 A1 * 11/2006 Hirschburger .......... B25F 5/021 362/119
2007/0234854 A1 * 10/2007 Collins ................. B25B 21/004 81/58.1
2007/0259723 A1 * 11/2007 Bertani ................... B23B 45/00 464/134
2008/0178709 A1 * 7/2008 Chen ................... B25B 23/0028 81/57.13
2009/0041535 A1 2/2009 Hu
2011/0229255 A1 9/2011 Su
2014/0338504 A1 * 11/2014 Beer ....................... B25B 23/00 81/57.39
2016/0229040 A1 * 8/2016 Yang ....................... B25B 13/04
2018/0325574 A1 * 11/2018 Bjork ................. A61B 17/1631
2019/0084131 A1 * 3/2019 Yang ................... B25B 23/0028
2020/0072294 A1 3/2020 Chen
2021/0156434 A1 5/2021 Yu
2021/0205966 A1 * 7/2021 Ho ...................... B25B 23/0028
2021/0301880 A1 9/2021 Su
2022/0241938 A1 8/2022 Chen
2022/0324086 A1 * 10/2022 Beer ................... B25B 23/0014
2023/0264338 A1 * 8/2023 Zheng ....................... B25F 5/00 173/217
2023/0339081 A1 10/2023 Zheng
2024/0026916 A1 1/2024 Shahmohammadi

FOREIGN PATENT DOCUMENTS

DE 102013204225 A1 9/2014
EP 0408987 B1 12/1994
WO 2023160348 A1 8/2023

OTHER PUBLICATIONS

International Search Report and Written Opinion of international application No. PCT/CN23/74214, mailed May 18, 2023, 9 pp. (Translation of Search Report only).
Office Action from Canadian application No. 3,198,899, dated Oct. 25, 2024, 2 pp.

* cited by examiner

POWER TOOL

RELATED APPLICATION INFORMATION

This application is a continuation of International Application Number PCT/US2023/074214, filed on Feb. 2, 2023, through which this application also claims the benefit under 35 U.S.C. § 119(a) of Chinese Patent Application No. 202210160116.6, filed on Feb. 22, 2022, which applications are incorporated herein by reference in their entirety.

TECHNICAL FIELD

The present application relates to a tool, for example, a power tool.

BACKGROUND

Power tools include handheld power tools and ground-placed power tools. The handheld power tools are classified into direct current handheld power tools and alternating current handheld power tools according to the requirements of completed operations, dimensions, and the like.

SUMMARY

To solve the deficiencies of the related art, the present application provides a handheld power tool.

The present application adopts the technical solutions described below.

A power tool includes: a main housing in which a drive mechanism is disposed; and a working head connected to an end of the main housing and rotating relative to the main housing about a first axis, where the working head includes an output shaft, and the output shaft is driven by the drive mechanism to rotate about a second axis. The main housing is provided with a window portion.

In some examples, a connection assembly connecting the output shaft to the drive mechanism is further included.

In some examples, the main housing includes a grip and a connection portion, the working head is connected to the connection portion, and the window portion is formed on the connection portion.

In some examples, the connection assembly connecting the output shaft to the drive mechanism is further included, and a position where the connection assembly is disposed corresponds to a position of the window portion.

In some examples, the window portion is configured to display an internal structure of the power tool.

In some examples, the window portion is an opening.

In some examples, the window portion includes a cover made of a transparent or translucent material.

In some examples, the connection portion is provided with a rotation slot, and the output shaft extends out of the rotation slot.

In some examples, the connection portion includes at least a guide portion in the shape of an arc or a curved surface, and the working head moves along the guide portion.

In some examples, the connection portion is formed with a first accommodation space, and the working head is at least partially disposed in the first accommodation space.

In some examples, the working head includes a moving portion connected to the output shaft, where the moving portion is limited in the first accommodation space and is movable relative to the connection portion about the first axis.

In some examples, the connection assembly includes: a first connector, where an end of the first connector is connected to the drive mechanism, and the first connector is driven by the drive mechanism to rotate; a second connector, where an end of the second connector is connected to the output shaft; and an intermediate member connecting the first connector to the second connector and movable relative to the first connector and the second connector to transmit power outputted by the drive mechanism to the output shaft.

In some examples, the connection assembly includes: a first connector, where an end of the first connector is connected to the drive mechanism, and the first connector is driven by the drive mechanism to rotate; a second connector, where an end of the second connector is connected to the output shaft; and a third connector connecting the first connector to the second connector and movable relative to the first connector and the second connector to transmit power outputted by the drive mechanism to the output shaft.

In some examples, the third connector includes: connection arms formed at two ends of the third connector; and intermediate members disposed at the two ends of the third connector and connected to the connection arms by rotating shafts.

In some examples, a connection arm is disposed at an end of the first connector or an end of the second connector and connected to the intermediate member by a rotating shaft.

In some examples, the third connector is detachably connected to the first connector and the second connector.

In some examples, the third connector is located in the middle of the window portion.

In some examples, the drive mechanism includes: a power supply assembly including a battery capable of storing energy or a power cord connecting an external energy supply device; an electric motor; and a transmission assembly connecting the electric motor to the working head.

In some examples, a switch assembly is further included, where the switch assembly is disposed on the main housing and configured to control the power tool to switch between states.

In some examples, the states include a start state, a stop state, a speed regulation state, a forward rotation state, and a reverse rotation state.

In some examples, the overall length of the power tool is less than or equal to 200 mm.

In some examples, the overall length of the power tool is less than or equal to 190 mm.

In some examples, the rated voltage of the power supply assembly is less than or equal to 10 V.

In some examples, the rated voltage of the power supply assembly is less than or equal to 6 V.

In some examples, the ratio of the length of the power supply assembly to a maximum overall length of the power tool is less than or equal to 0.3 and greater than or equal to 0.15.

In some examples, the power tool includes a positioning assembly configured to position a rotational position of the working head.

In some examples, the main housing includes a grip and a connection portion, and the working head is connected to the connection portion; the working head includes a moving portion rotating relative to the connection portion; and a locking assembly is disposed between the moving portion and the connection portion.

In some examples, the connection portion includes several positioning slots, and the locking assembly includes a positioning pin movable relative to the several positioning slots, where the working head is limited at a set position when the positioning pin is connected to one of the several positioning slots.

A power tool includes: a main housing in which a drive mechanism is disposed; and a working head connected to an end of the main housing and rotating relative to the main housing about a first axis, where the working head includes an output shaft, and the output shaft is driven by the drive mechanism to rotate about a second axis. A connection assembly connecting the output shaft to the drive mechanism is further included.

In some examples, the main housing is provided with a window portion.

In some examples, the connection assembly is observable through the window portion.

In some examples, the connection assembly includes: a first connector, where an end of the first connector is connected to the drive mechanism, and the first connector is driven by the drive mechanism to rotate; a second connector, where an end of the second connector is connected to the output shaft; and an intermediate member connecting the first connector to the second connector and movable relative to the first connector and the second connector to transmit power outputted by the drive mechanism to the output shaft.

In some examples, the connection assembly includes: a first connector, where an end of the first connector is connected to the drive mechanism, and the first connector is driven by the drive mechanism to rotate; a second connector, where an end of the second connector is connected to the output shaft; and a third connector connecting the first connector to the second connector and movable relative to the first connector and the second connector to transmit power outputted by the drive mechanism to the output shaft.

In some examples, the third connector includes: connection arms formed at two ends of the third connector; and intermediate members disposed at the two ends of the third connector and connected to the connection arms by rotating shafts.

In some examples, a connection arm is disposed at an end of the first connector or an end of the second connector and connected to the intermediate member by a rotating shaft.

In some examples, the third connector is detachably connected to the first connector and the second connector.

In some examples, the main housing is provided with the window portion, and the third connector is located in the middle of the window portion.

In some examples, the connection assembly is a universal joint.

A power tool includes: a main housing in which a drive mechanism is disposed, where the drive mechanism includes a battery for storing energy; and a working head connected to an end of the main housing and rotating relative to the main housing about a first axis, where the working head includes an output shaft, and the output shaft is driven by the drive mechanism to rotate about a second axis. The ratio of the length of the battery to a maximum overall length of the power tool is less than or equal to 0.3 and greater than or equal to 0.15.

A power tool includes: a main housing in which a drive mechanism is disposed, where the drive mechanism includes a battery for storing energy; and a working head connected to an end of the main housing and rotating relative to the main housing about a first axis, where the working head includes an output shaft, and the output shaft is driven by the drive mechanism to rotate about a second axis. The working head includes a moving portion connected to the main housing, where the moving portion rotates relative to the main housing and is capable of being limited at several set positions.

In some examples, the second axis forms an included angle with the main housing, and the several set positions correspond to included angles of different sizes.

A power tool includes: a main housing in which a drive mechanism is disposed; and a working head connected to an end of the main housing and rotating relative to the main housing about a first axis, where the working head includes an output shaft, and the output shaft is driven by the drive mechanism to rotate about a second axis. The working head is provided with a window portion.

DETAILED DESCRIPTION

In the description of the present application, the terms “joined”, “connected”, and “fixed” are to be understood in a broad sense unless otherwise expressly specified and limited. For example, the term “connected” may refer to “fixedly connected”, “detachably connected”, or integrated, may refer to “mechanically connected” or “electrically connected”, or may refer to “connected directly”, “connected indirectly through an intermediary”, “connected inside two components”, or “an interaction relation between two components”. For those of ordinary skill in the art, meanings of the preceding terms in the present application may be understood based on situations.

In the present application, unless otherwise expressly specified and limited, when a first feature is described as “on” or “below” a second feature, the first feature and the second feature may be in direct contact or be in contact via another feature between the two features instead of being in direct contact. Moreover, when the first feature is described as “on”, “above”, or “over” the second feature, the first feature is right on, above, or over the second feature or the first feature is obliquely on, above, or over the second feature, or the first feature is simply at a higher level than the second feature. When the first feature is described as “under”, “below”, or “underneath” the second feature, the first feature is right under, below, or underneath the second feature or the first feature is obliquely under, below, or underneath the second feature, or the first feature is simply at a lower level than the second feature.

The present application is described below in conjunction with drawings and examples.

Figure 1:
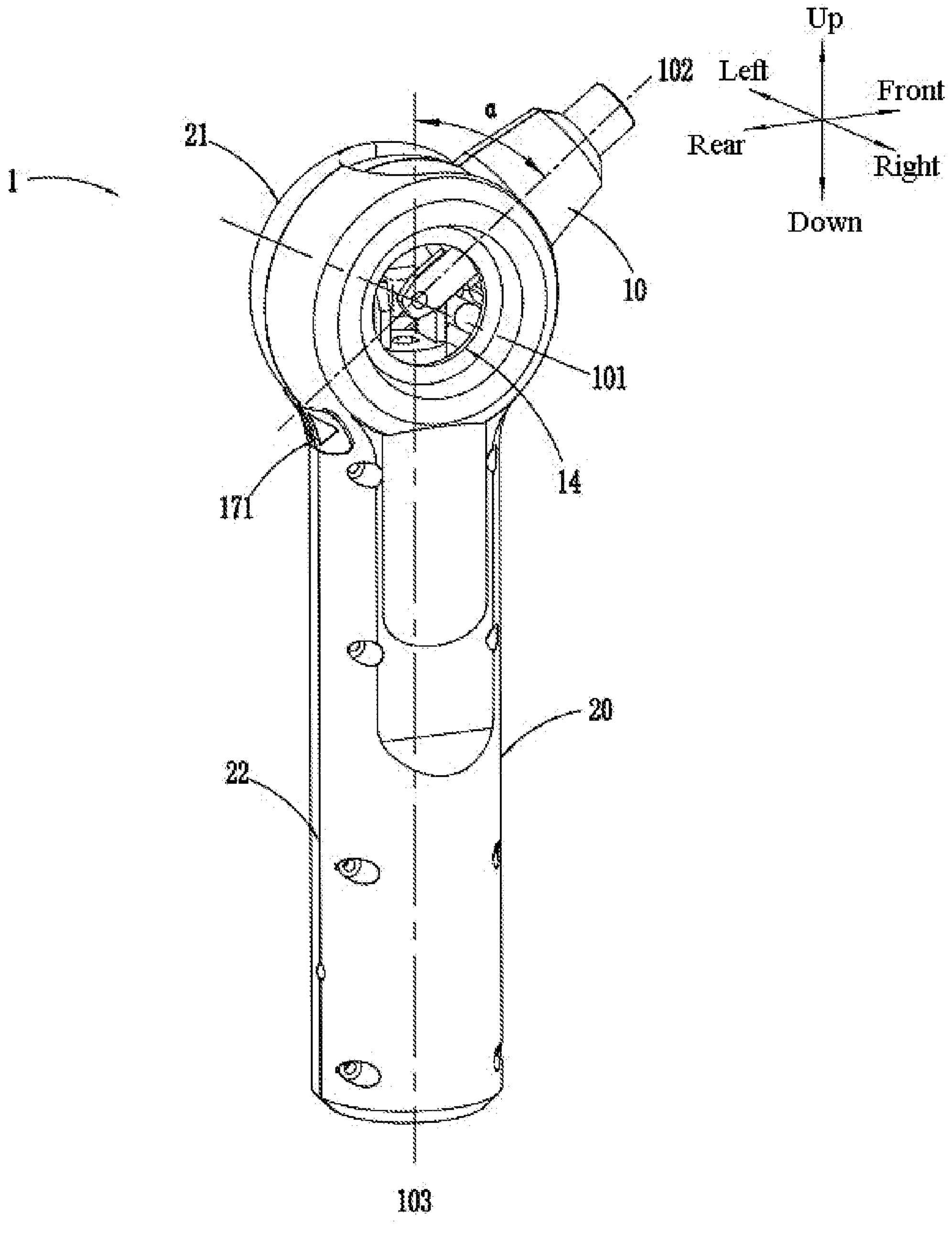
FIG. 1 is a perspective view of the present application.

To describe technical solutions of the present application clearly, the directions “up”, “down”, “left”, “right”, “front”, and “rear” as shown in FIG. 1 are further defined.

As shown in FIGS. 1 to 6, a power tool 1 includes a working head 10, a main housing 20, and a drive mechanism 30. The working head 10 may output power directly or may be connected to another working accessory to output power. According to different working modes or output power of a tool head 10, the power tool 1 may be corresponding tools, such as a screwdriver, a drill, or a wrench. The working head 10 is connected to an end of the main housing 20 and rotates relative to the main housing 20 about a first axis 101 under the action of an external force. The working head 10 is connected to the drive mechanism 30 and outputs power under the action of the drive mechanism 30.

The working head 10 includes an output shaft 11, and the output shaft 11 is driven by the drive mechanism 30 to rotate about a second axis 102. In this example, the screwdriver is used as an example, and a mounting slot 111 for mounting different bits is further formed at an end of the output shaft 11.

The whole main housing 20 extends along the direction of a third axis 103. The main housing 20 includes a grip 22 and a connection portion 21. The connection portion 21 is formed at or connected to an end of the grip 22, and the connection portion 21 is configured to connect the working head 10. The connection portion 21 is formed with a first accommodation space, and the grip 22 is formed with a second accommodation space, where the first accommodation space and the second accommodation space communicate with each other. Most of the drive mechanism 30 is disposed in the second space formed by the grip 22.

The working head 10 further includes a moving portion 12 connected to the main housing 20 and rotating relative to the main housing 20 about the second axis 102. The moving portion 12 is movably connected to the connection portion 21 or is disposed in the first accommodation space. In this example, the working head 10 further includes an output shaft housing 13, where the output shaft housing 13 is wrapped on the periphery of the output shaft 11 and connected to or integrally formed with the moving portion 12.

The connection portion 21 is provided with a rotation slot 211, where the output shaft 11 extends out of the rotation slot 211, and the moving portion 12 is limited in the rotation slot 211. The connection portion 21 includes an arc-shaped or arc-like guide portion, and the working head 10 moves along the guide portion. In some examples, the rotation slot 211 may be a closed slot body formed with a space in which the moving portion 12 is placed. In some examples, the rotation slot 211 may be an open slot and has a limiting portion for limiting the movement of the moving portion 12. The limiting portion is provided so that a limiting slot with an opening is formed by the rotation slot 211 in the first accommodation space. The output shaft 11 extends out of the rotation slot 211, and the outer diameter of an end of the output shaft 11 connected to the moving portion 12 is approximately equal to the width of the rotation slot so that the end is engaged with the rotation slot 211. The rotation slot 211 is disposed on the peripheral side (that is, the side around the first axis 101) of the connection portion 21. In this example, the peripheral side of the connection portion 21 is a curved surface, and the moving portion 12 is a curved surface corresponding to the peripheral side of the connection portion in shape. The surface of the moving portion 12 fits around the inner surface of the connection portion 21 so that the moving portion 12 is movable along the rotation slot 211 on the connection portion 21.

Figure 2:
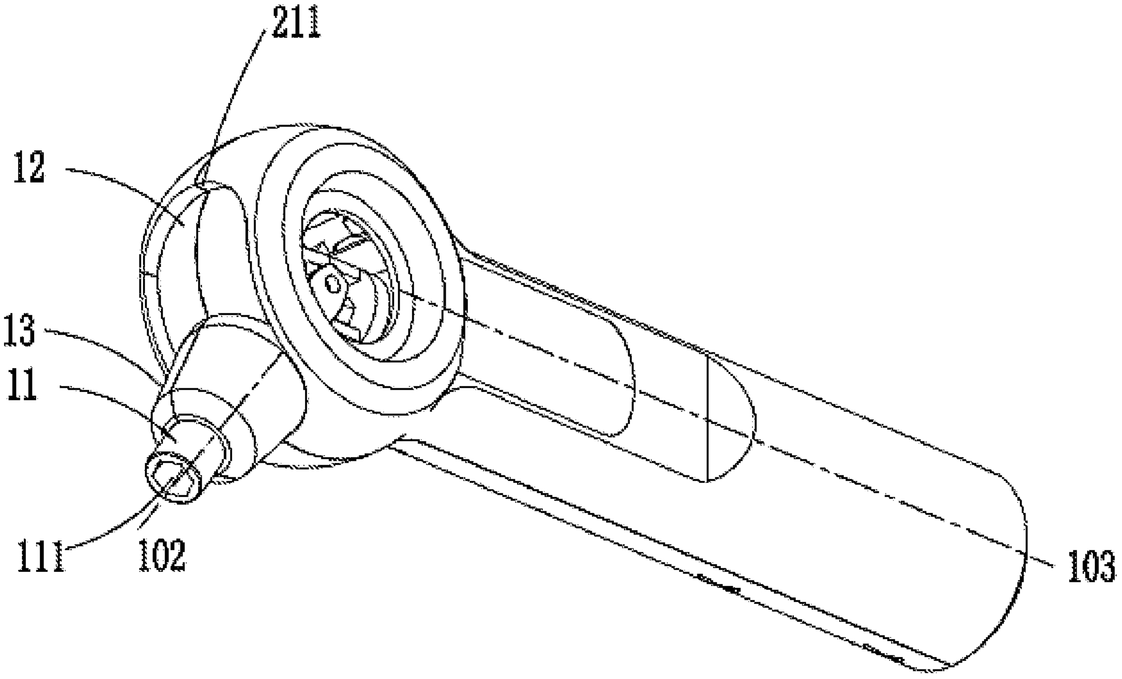
FIG. 2 is a perspective view of the present application from another angle of view.

As shown in FIGS. 1 and 2, the rotation slot 211 has a certain length corresponding to the rotation stroke of the working head 10 relative to the main housing 20 about the first axis 101. It is to be understood that the length of an arc over which the working head rotates is the preceding rotation stroke. The angle of the arc is $\alpha$, where $\alpha$ is greater than or equal to 0° and less than or equal to 90°. In some examples, $\alpha$ is greater than or equal to 0° and less than or equal to 60°. In some examples, $\alpha$ is greater than or equal to 0° and less than or equal to 30°. In some examples, $\alpha$ is greater than or equal to 0° and less than or equal to 16°.

Figure 3:
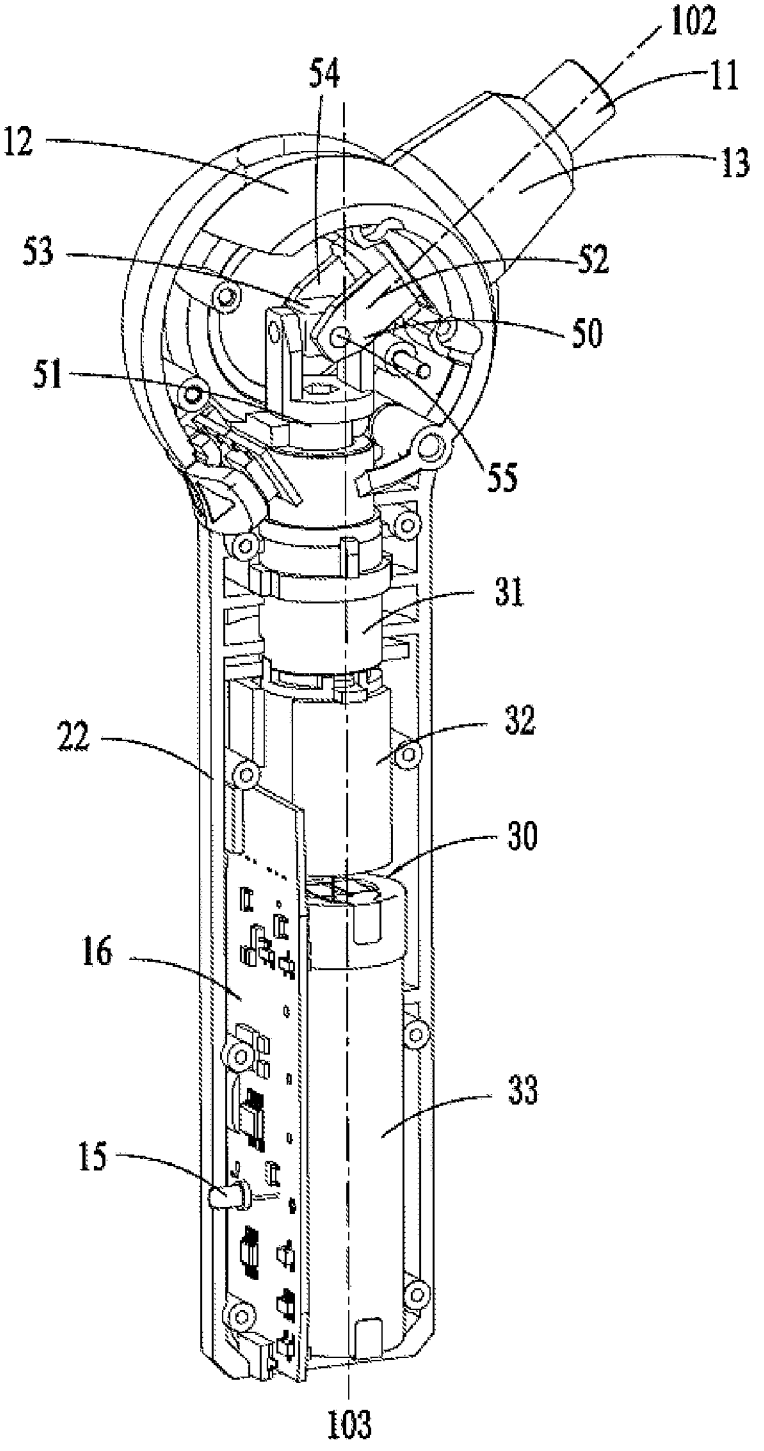
FIG. 3 is a schematic view of the internal structure of the present application.
Figure 4:
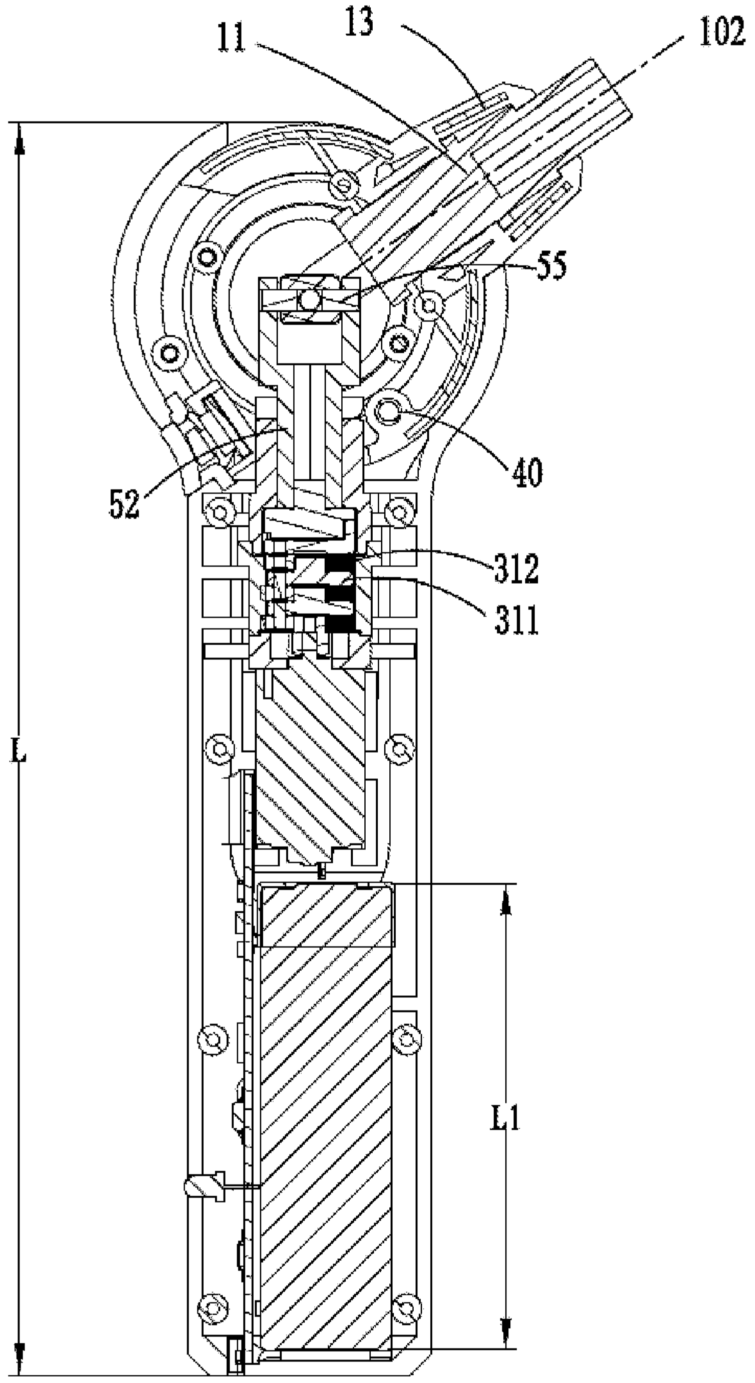
FIG. 4 is a sectional view of the present application.

As shown in FIGS. 3 and 4, the drive mechanism 30 is disposed in the main housing 20 along the third axis 103. In this example, the drive mechanism 30 is disposed in the second accommodation space, or at least most of the drive mechanism 30 is disposed in the second accommodation space. The drive mechanism 30 includes a power supply assembly 33, an electric motor 32, and a transmission assembly 31. The transmission assembly 31, the electric motor 32, and the power supply assembly 33 are sequentially connected from top to bottom.

In this example, the power supply assembly 33 is an internal battery pack accommodated at the bottom of the grip 22. To increase the amount of power stored in the power supply assembly 33 to prolong the service life thereof, the power supply assembly 33 increases the width of the grip 22 at the corresponding position. A charging port may be disposed at an end of the main housing 20, and the power supply assembly 33 is electrically connected to a charger socket located at the lower end of the grip 22. In some examples, the power supply assembly 33 is a rechargeable battery removable from the grip 22. The power supply assembly 33 may be mains, an alternating current power supply, or a hybrid of mains and a battery pack and implements power supply in conjunction with corresponding rectifying, filtering, and voltage regulating circuits.

The electric motor 32 is electrically connected to the power supply assembly 33, and the power supply assembly 33 supplies output power to the electric motor 32. In this example, the nominal voltage of the power supply assembly 33 is less than or equal to 10 V. In some examples, the nominal voltage is less than or equal to 6 V. In this example, for example, a handheld electric screwdriver has a nominal voltage of 4 V to 5 V, and the power supply assembly 33 is a battery. In some examples, the power supply assembly 33 may be a universal detachable replaceable battery or a universal detachable rechargeable battery.

The length L1 of the power supply assembly 33 is greater than or equal to 30 mm and less than or equal to 50 mm. It is to be noted that the length of each assembly of the drive mechanism 30 refers to the length of each assembly of the drive mechanism 30 in the direction of the third axis 103.

The power tool 1 has an overall length L, and the overall length L refers to the length of the main housing 20. The overall length L is less than or equal to 200 mm. In some examples, the overall length L of the power tool 1 is less than or equal to 190 mm. In some examples, the overall length L of the power tool 1 is less than or equal to 180 mm. The ratio of the length L1 of the power supply assembly 33 to the overall length L is greater than or equal to 0.15 and less than or equal to 0.3.

The transmission assembly 31 is configured to transmit power outputted by the electric motor 32 to the output shaft 11. The transmission assembly 31 is disposed between the output shaft 11 and the electric motor 32, and the transmission assembly 31 is at least partially or entirely disposed in the grip 22 and may be at least partially disposed in the connection portion 21. In this example, the transmission assembly 31 is decelerated by a planet gear. The transmission assembly 31 includes a planet gearset 311 and a gearbox housing 312. The planet gearset 311 includes a planet gear of one stage or planet gears of two stages, three stages, or more stages. An internal tooth structure is disposed on the inner side of the gearbox housing 312. Since deceleration and torque increase produced by the transmission assembly and the working principle of planet gear deceleration have been fully disclosed to those skilled in the art, a detailed description is omitted herein for the brevity of the description.

In some examples, the length of the power supply assembly 33 is less than the length of the transmission assembly 31.

As shown in FIGS. 3 to 6, the power tool 1 further includes a connection assembly 50. The connection assembly 50 is connected to the transmission assembly 31 and the output shaft 11. The connection assembly 50 is configured to transmit a rotation about the third axis 103 to the output shaft 11 so that the output shaft 11 rotates about the second axis 102. The second axis 102 and the third axis 103 may coincide with each other. After the output shaft 11 rotates about the first axis 101, the second axis 102 and the third axis 103 form an included angle, and the included angle is the angle α of the arc over which the working head rotates.

In this example, the connection assembly 50 includes a first connector 51, a second connector 52, and an intermediate member 53. One end of the first connector 51 is connected to the transmission assembly 31, and the first connector 51 is driven by the drive mechanism 30 to rotate. One end of the second connector 52 is connected to the output shaft 11, and the other end of the second connector 52 is connected to the intermediate member 53. The intermediate member 53 moves relative to the first connector 51 and the second connector 52 to transmit power outputted by the drive mechanism 30 to the output shaft 11. The first connector 51 and the second connector 52 have similar structures, and one of the first connector 51 and the second connector 52 is described below. Protruding connection arms 54 are disposed at an end of the first connector 51 and an end of the second connector 52, where each of the connection arms 54 includes two connection arm units disposed on two sides of the intermediate member 53, and the connection arms 54 are connected to the intermediate member 53 by rotating shafts 55. The first connector 51 and the second connector 52 are rotatable relative to the intermediate member about their respective rotating shafts 55. Two rotating shafts 55 are perpendicular to each other. For example, the intermediate member 53 may be a cube or a sphere, which saves more space.

The first connector 51, the intermediate member 53, and the second connector 52 constitute a universal joint mechanism.

The intermediate member 53 is configured to display the logo or special appearance of a product or a product shape, or the intermediate member 53 may be configured to display product information. For example, the intermediate member 53 indicates the rotation angle of the output shaft 11 about the first axis 101 or the rotational speed of the output shaft 11. In some examples, a state display unit is disposed on the intermediate member 53. The display unit includes a liquid crystal display (LCD)/light-emitting diode (LED) display, a buzzer, a component like a light-emitting diode, or another component with a prompt function, and the display unit is configured to display or prompt a state when the power tool has an abnormal working state or a low state of charge. A prompt mode varies with a product definition and requirement. It is to be understood that the prompt mode has been fully disclosed to those skilled in the art.

The main housing 20 is provided with a window portion 14, and the window portion 14 is configured to display an internal structure of the power tool 1. In this example, the window portion 14 includes a window slot 212 formed on the main housing 20 and a cover 141 disposed on the window slot 212. The cover 141 is made of a transparent or translucent material so that a user can observe the internal structure of the power tool 1. In this example, the window portion 14 is disposed on the connection portion 21, and the window portion 14 is opposite to the connection assembly 50 in position so that part of the structure of the connection assembly 50 is displayed in the window portion. The window portion 14 is opposite to the intermediate member 53 in position so that the intermediate member 53 is displayed in the window portion, and the display or indication function described above has been fulfilled. Since the output shaft housing 13 extends to the position of the connection assembly 50, a portion of the output shaft housing 13 corresponding to the window portion 14 is provided with a first through hole 131. The diameter of the first through hole 131 is larger than the diameter of the window slot 212.

In other alternative examples, the window portion and the main housing 20 are an integrally formed structure, where the transparent or translucent window portion and the main housing 20 form an integrated structure, that is, a non-detachable structure, through insert molding or the like. In some examples, to facilitate manufacturing and increase a gorgeous effect, the whole main housing is configured to be a window portion, that is to say, the whole main housing forms a transparent or translucent structure.

In this example, the cover 141 includes a protruding central portion 1411 and a recessed peripheral portion 1412, that is, a height difference exists between the central portion 1411 and the peripheral portion 1412 so that the central portion 1411 and the peripheral portion 1412 are not in the same plane. The peripheral portion 1412 is disposed in the window slot 212, and the central portion 1411 is engaged with the window slot 212 and extends out of the window slot 212 to seal the main housing 20.

In other examples, the window portion 14 is an opening including no cover. In other examples, a display unit is disposed on the cover 141 of the window portion 14 and includes an LCD/LED display.

On the other hand, the window portion with the detachable cover is provided so that it is convenient to replace a damaged connection assembly 50.

In other examples, the window portion 14 is disposed on the working head 10. In this case, a housing similar to the connection portion 21 is formed on the working head 10, or the moving portion of the working head 10 is a housing similar to the connection portion 21.

As shown in FIGS. 1 to 3, the power tool 1 further includes an operation member and a controller. The operation member includes a main switch 171 and a switching operation member. The main switch 171 is configured to control the start and stop of the electric motor 32. The switching operation member is configured to switch a forward rotation state and a reverse rotation state of the electric motor 32. The main switch 171 is disposed at the joint of the grip 22 and the connection portion 21. In this example, the main switch 171 is disposed on a side adjacent to the window portion 14. In this example, the switching operation member is combined with the main switch. The main switch 171 and the switching operation member are disposed on a side opposite to the rotation slot 211. That is to say, when operated, the main switch 171 and the switching operation member are operated by the thumb of an operator most of the time. It is convenient to operate the switch during use.

The controller is disposed on a control circuit board 16. The control circuit board 16 includes a printed circuit board (PCB) and a flexible printed circuit board (FPC). A dedicated control chip is used as the controller, for example, a single-chip microcomputer or a microcontroller unit (MCU).

The operation member is connected to a corresponding switch. The switch is electrically connected to the controller. According to different signals sent by the switch, the controller performs corresponding control actions on the electric motor.

Figure 5:
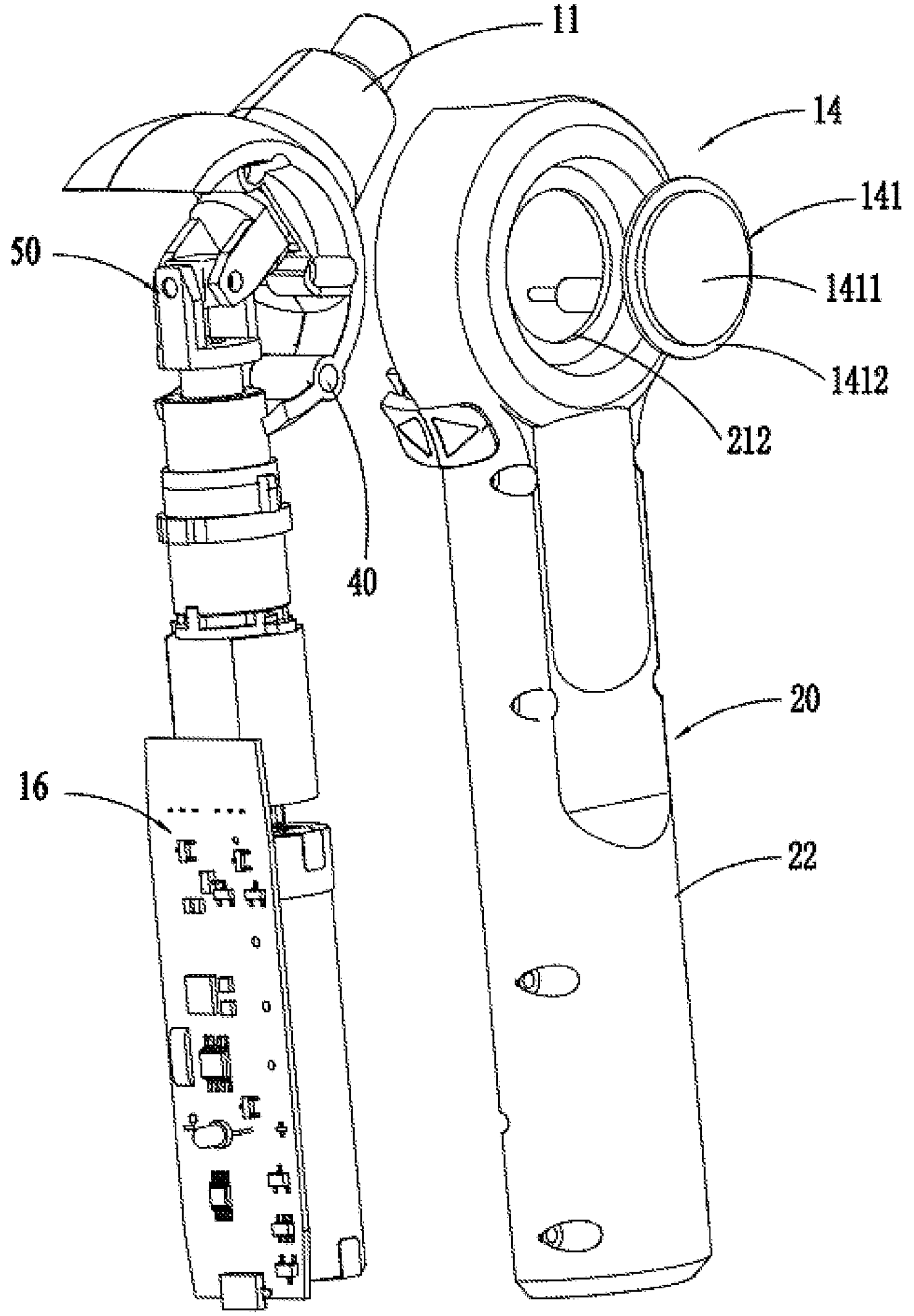
FIG. 5 is an exploded view of the internal structure of the present application.
Figure 6:
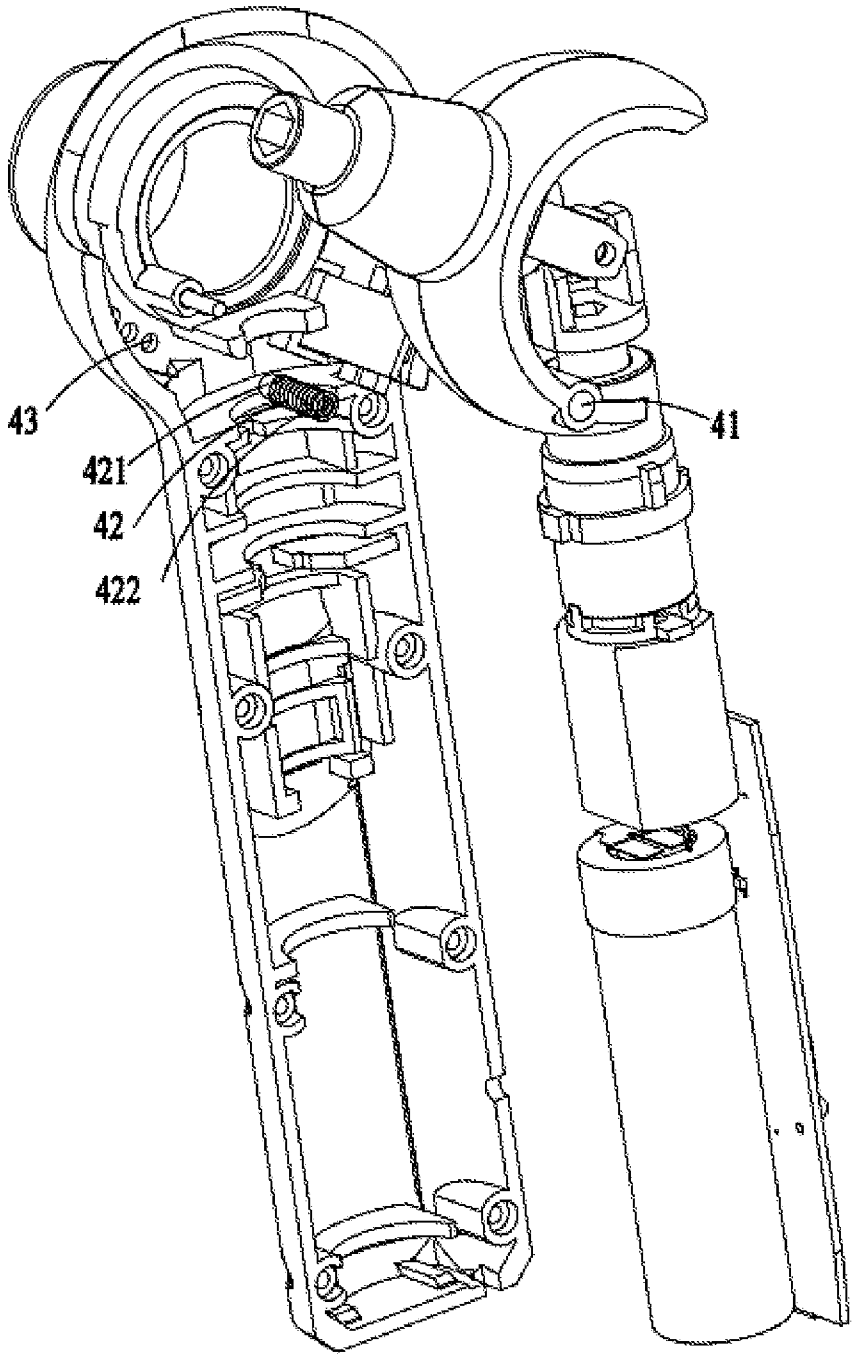
FIG. 6 is an exploded view of the internal structure of the present application from another angle of view.

As shown in FIGS. 4 to 6, the power tool 1 further includes a positioning assembly 40 configured to position a rotational position of the tool head 10 relative to the main housing 20 about the first axis 101. The positioning assembly 40 is disposed between the moving portion 12 and the connection portion 21 and couples the moving portion 12 to the connection portion 21 to stop the tool head 10 at a set position.

The positioning assembly 40 includes a base 41, a positioning pin 42, and a positioning slot 43. Multiple positioning slots 43 are provided. The multiple positioning slots 43 are disposed on the inner side of the connection portion 21. In this example, multiple angle indicators are disposed on the outer side of the connection portion 21, that is, a side observable by the user. The number of angle indicators is the same as the number of positioning slots 43. The base 41 is disposed on the tool head 10. In this example, the base 41 is disposed on the moving portion 12. The base 41 extends along the direction of the first axis 101. The positioning pin 42 connects the moving portion 12 to the connection portion 21. One end of the positioning pin 42 is connected to the base 41, and the other end of the positioning pin 42 is clutchably connected to the positioning slot 43. The positioning pin 42 is movable in the base 41 and relative to the moving portion 12. The movement of the positioning pin 42 is caused by the rotation of the tool head 10 about the first axis 101, and several positioning slots 43 correspond to the positioning pin 42 in shape. The positioning slot 43 is connected to the positioning pin 42 to position the tool head 10. The position of each positioning slot 43 corresponds to a different rotation angle of the tool head 10.

When the tool head 10 rotates from one angle to another, the positioning pin 42 moves from a corresponding positioning slot 43 into the base 41 and then moves from the base 41 to another positioning slot 43. In this example, the positioning pin 42 includes a ball 421 and a telescopic member 422. When the tool head 10 is rotated, the ball 421 moves in a slot adjacent to the positioning slot 43 to a slot wall to be pressed by the slot wall, and the ball 421 biases the telescopic member 422. When the ball 421 enters the positioning slot 43, the telescopic member 422 supports the ball 421 to keep the ball 421 in the positioning slot 43.

The power tool 1 further includes an illumination assembly 15. The illumination assembly 15 is disposed on the control circuit board 16. The control circuit board 16 is electrically connected to the drive mechanism 30. The control circuit board 16 is disposed in the grip 22 and is parallel or substantially parallel to the drive mechanism 30 or the third axis 103. Being substantially parallel refers to the case where the included angle between the control circuit board 16 and the drive mechanism 30 or the third axis 103 is less than or equal to 10°.

Figure 7:
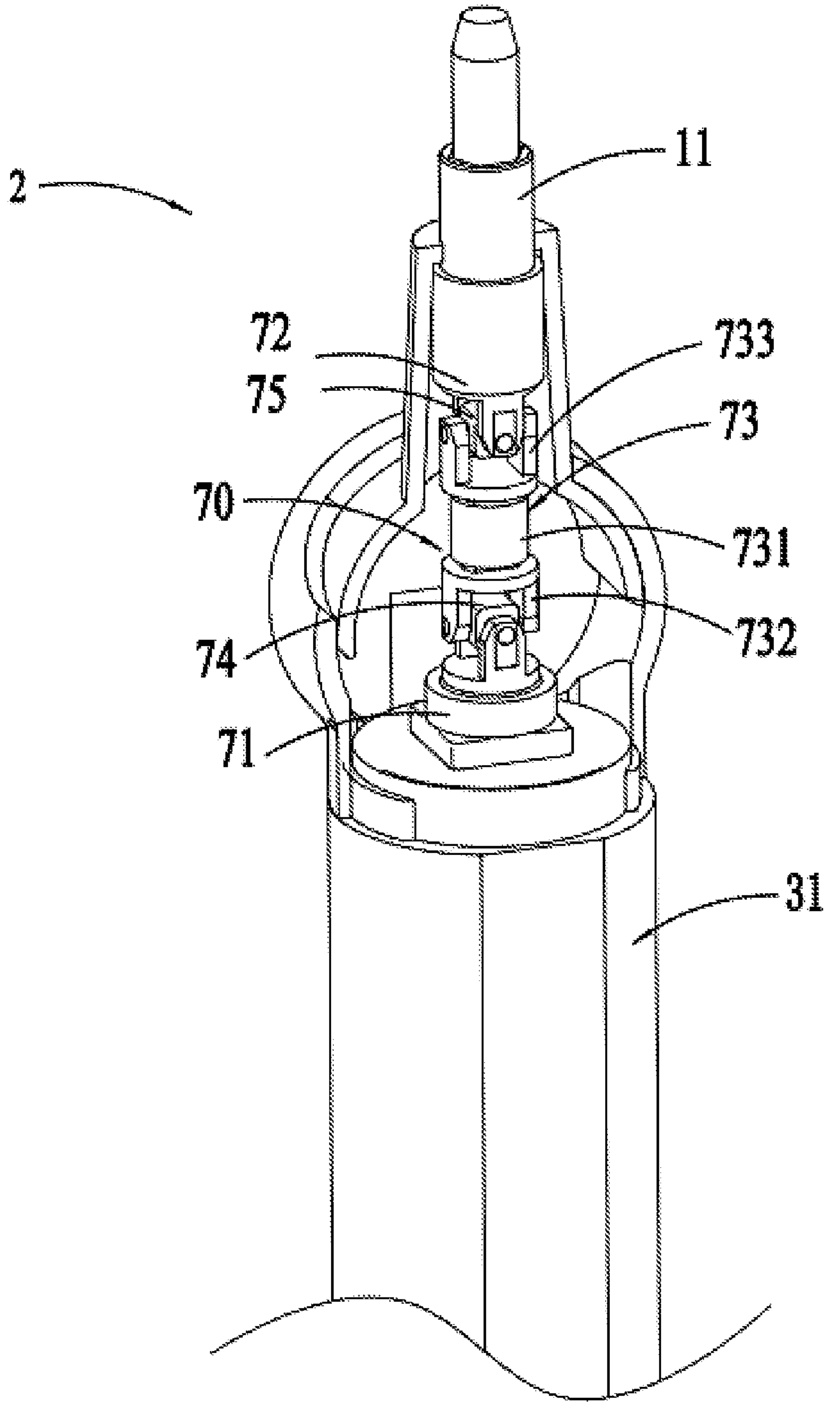
FIG. 7 is a partial schematic view of another example of the present application.

In another example of the present application, as shown in FIG. 7, a power tool 2 different from the preceding power tool is further provided. Only differences between the power tool 2 and the preceding power tool are described below, and the same reference numerals are used for the same components.

In this example, the power tool 2 includes a connection assembly 70, and the connection assembly 70 includes a first connector 71, a second connector 72, and a third connector 73. One end of the first connector 71 is connected to the transmission assembly 31, and the first connector 71 is driven by the drive mechanism 30 to rotate. The other end of the first connector 71 is connected to the third connector 73. One end of the second connector 72 is connected to the output shaft 11, and the other end of the second connector 72 is connected to the third connector 73. Protruding connection arms are disposed at an end of the first connector 71 and an end of the second connector 72, and the other end of the first connector 71 and the other end of the second connector 72 are tubular or cylindrical. A protruding first connection arm 732 and a protruding second connection arm 733 are disposed at two ends of the third connector 73 separately. A first intermediate member 74 and a second intermediate member 75 are disposed between the first connector 71 and the third connector 73 and between the second connector 72 and the third connector 73, respectively.

The third connector 73 is configured to display a product shape, or the third connector 73 may be configured to display product information. For example, the third connector 73 indicates the rotation angle of the output shaft 11 about the first axis 101 or the rotational speed of the output shaft 11. The third connector 73 further includes a direction-changing support 731 connecting a first claw portion 732 to a second claw portion 733 and enabling the relative movement between the first claw portion 732 and the second claw portion 733. In this example, the first connector 71, the first intermediate member 74, and the first claw portion 732 constitute a first universal joint mechanism. The second connector 72, the second intermediate member 75, and the second claw portion 733 constitute a second universal joint mechanism. A fourth connector is disposed in the direction-changing support 731. The fourth connector connects the first universal joint mechanism to the second universal joint mechanism. In this case, the first universal joint mechanism and the second universal joint mechanism move relative to each other.

The exterior of the direction-changing support 731 is configured to display the logo or special appearance of a product, or the exterior of the direction-changing support 731 may be configured to display product information. For example, the exterior of the direction-changing support 731 indicates the rotation angle of the output shaft 11 about the first axis 101 or the rotational speed of the output shaft 11. In some examples, a state display unit is disposed on the exterior of the direction-changing support 731. The display unit includes an LCD/LED display, a buzzer, a component like a light-emitting diode, or another component with a prompt function, and the display unit is configured to display or prompt a state when the power tool has an abnormal working state or a low state of charge. A prompt mode varies with a product definition and requirement. It is to be understood that the prompt mode has been fully disclosed to those skilled in the art.

The third connector 73 is detachably connected to the first connector 71 and the second connector 72, and the third connector 73 is detachable and replaceable. Multiple universal joint mechanisms are used for transmission, which can increase the range of a without reducing the speed transmitted to the output shaft.

The power tool of the present application is applicable to various working conditions, very stable, and convenient to operate. The power tool has a display or indication function and is convenient for the maintenance or replacement of the internal structure and the implementation of various functions is claimed is:

What is claimed is:

1. A power tool, comprising:
- a main housing in which a drive mechanism is disposed; and
- a working head connected to an end of the main housing and rotatable relative to the main housing about a first axis,
- wherein the working head comprises an output shaft, the output shaft is driven by the drive mechanism to rotate about a second axis, the main housing is provided with a window portion, and the window portion is configured to display an internal structure of the power tool, and
- wherein the working head is provided with a first through hole corresponding to the window portion.

2. The power tool according to claim 1, wherein the main housing comprises a grip and a connection portion, the working head is connected to the connection portion, and the window portion is formed on or connected to the connection portion.

3. The power tool according to claim 2, wherein the connection portion is formed with a first accommodation space, and the working head is at least partially disposed in the first accommodation space.

4. The power tool according to claim 3, wherein the working head comprises a moving portion connected to the output shaft, and the moving portion is limited in the first accommodation space and is movable relative to the connection portion about the first axis.

5. The power tool according to claim 1, further comprising a connection assembly connecting the output shaft to the drive mechanism.

6. The power tool according to claim 5, wherein a position where the connection assembly is disposed corresponds to a position of the window portion.

7. The power tool according to claim 6, wherein the window portion comprises a cover made of a transparent or translucent material.

8. The power tool according to claim 5, wherein the connection assembly comprises:
- a first connector, wherein an end of the first connector is connected to the drive mechanism, and the first connector is driven by the drive mechanism to rotate;
- a second connector, wherein an end of the second connector is connected to the output shaft; and
- a third connector connecting the first connector to the second connector and movable relative to the first connector and the second connector to transmit power outputted by the drive mechanism to the output shaft, wherein the third connector is located in the middle of the window portion.

9. The power tool according to claim 1, wherein the window portion is an opening.

10. The power tool according to claim 1, wherein the main housing extends along a third axis, and the second axis rotates about the first axis to be at a plurality of angular positions relative to the third axis.

11. The power tool according to claim 1, wherein the drive mechanism comprises:
- a power supply assembly comprising a battery capable of storing energy;
- an electric motor; and
- a transmission assembly connected to the electric motor and the working head.

12. The power tool according to claim 11, wherein a rated voltage of the power supply assembly is less than or equal to 10 V.

13. The power tool according to claim 1, wherein an overall length of the power tool is less than or equal to 200 mm.

14. The power tool according to claim 1, wherein an overall length of the power tool is less than or equal to 180 mm.

15. A power tool, comprising:
- a main housing in which a drive mechanism is disposed;
- a working head connected to an end of the main housing and rotatable relative to the main housing about a first axis, and
- a connection assembly connecting an output shaft to the drive mechanism to transmit power outputted by the drive mechanism to the output shaft,
- wherein the working head comprises an output shaft, the output shaft is driven by the drive mechanism to rotate about a second axis, the main housing is provided with a window portion, the window portion comprises a cover made of a transparent or translucent material, and the connection assembly is configured to be observable through the window portion.

16. The power tool according to claim 15, wherein the drive mechanism comprises:
- a power supply assembly comprising a battery capable of storing energy;
- an electric motor; and
- a transmission assembly connected to the electric motor and the working head.

17. The power tool according to claim 16, wherein a rated voltage of the power supply assembly is less than or equal to 10 V.

18. The power tool according to claim 16, wherein a rated voltage of the power supply assembly is less than or equal to 6 V.

19. The power tool according to claim 16, wherein a ratio of a length of the power supply assembly to a maximum overall length of the power tool is less than or equal to 0.3 and greater than or equal to 0.15.

20. The power tool according to claim 15, wherein an overall length of the power tool is less than or equal to 200 mm.

21. The power tool according to claim 15, wherein an overall length of the power tool is less than or equal to 180 mm.

22. The power tool according to claim 15, wherein the connection assembly comprises:
- a first connector, wherein an end of the first connector is connected to the drive mechanism, and the first connector is driven by the drive mechanism to rotate;
- a second connector, wherein an end of the second connector is connected to the output shaft; and
- a third connector connecting the first connector to the second connector and movable relative to the first connector and the second connector to transmit power outputted by the drive mechanism to the output shaft.

23. The power tool according to claim 22, wherein the third connector comprises:
- claw portions formed at two ends of the third connector; and
- intermediate members disposed at the two ends of the third connector and connected to the claw portions by rotating shafts.

24. The power tool according to claim 23, wherein a connection arm is disposed at an end of the first connector or an end of the second connector and connected to the intermediate member by a rotating shaft.

25. The power tool according to claim 22, wherein the third connector is detachably connected to the first connector and the second connector.

26. A power tool, comprising:

a main housing in which a drive mechanism is disposed; and a working head connected to an end of the main housing and rotatable relative to the main housing about a first axis, wherein the working head comprises an output shaft, the output shaft is driven by the drive mechanism to rotate about a second axis, and the main housing or the working head is provided with a window portion so that an internal structure of the working head is configured to be observable through the window portion.

* * * * *